United States Patent
Meguriya

(10) Patent No.: US 7,049,375 B2
(45) Date of Patent: May 23, 2006

(54) ADDITION CURING SILICONE RUBBER COMPOSITION AND PRESSURE-SENSITIVE ADHESIVE RUBBER SHEET

(75) Inventor: Noriyuki Meguriya, Matsuida-machi (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 80 days.

(21) Appl. No.: 10/732,467

(22) Filed: Dec. 11, 2003

(65) Prior Publication Data

US 2004/0122142 A1 Jun. 24, 2004

(30) Foreign Application Priority Data

Dec. 12, 2002 (JP) .............................. 2002-361203

(51) Int. Cl.
*C08L 83/00* (2006.01)

(52) U.S. Cl. ..................... 525/477; 525/478; 525/479; 528/15; 528/31; 528/32

(58) Field of Classification Search ................. 528/15, 528/31, 32; 525/478, 479
See application file for complete search history.

(56) References Cited

U.S. PATENT DOCUMENTS

| | | | |
|---|---|---|---|
| 3,983,298 A | * | 9/1976 | Hahn et al. ........... 428/355 RA |
| 4,427,801 A | * | 1/1984 | Sweet .................. 523/212 |
| 4,774,297 A | | 9/1988 | Murakami et al. |
| 5,292,586 A | * | 3/1994 | Lin et al. ............. 428/355 R |
| 5,366,809 A | * | 11/1994 | Schmidt et al. ......... 428/447 |
| 5,373,078 A | * | 12/1994 | Juen et al. ............ 528/15 |
| 5,466,532 A | * | 11/1995 | Wengrovius et al. ..... 428/447 |
| 5,756,598 A | * | 5/1998 | Chung et al. .......... 525/478 |
| 6,124,407 A | * | 9/2000 | Lee et al. ............ 525/478 |

FOREIGN PATENT DOCUMENTS

JP        8-134427 A        5/1996

* cited by examiner

*Primary Examiner*—Marc S. Zimmer
(74) *Attorney, Agent, or Firm*—Birch, Stewart, Kolasch & Birch, LLP

(57) ABSTRACT

An addition curing silicone rubber composition comprising (A) an alkenyl-containing organopolysiloxane, (B) a resinous copolymer composed mainly of $R_3SiO_{1/2}$ units and $SiO_2$ units in a molar ratio between 0.5/1 and 1.5/1 wherein R stands for a monovalent hydrocarbon group and is substantially free of alkenyl groups, (C) a resinous copolymer composed mainly of $R'_3SiO_{1/2}$ units and $SiO_2$ units in a molar ratio between 0.5/1 and 1.5/1 wherein R' stands for a monovalent hydrocarbon group and includes an alkenyl group, and the total content of alkenyl groups is at least 0.0001 mol/g, (D) an organohydrogenpolysiloxane, and (E) an addition reaction catalyst cures into a silicone rubber sheet that has a satisfactory rubber strength and surface adhesive property.

10 Claims, No Drawings

ADDITION CURING SILICONE RUBBER COMPOSITION AND PRESSURE-SENSITIVE ADHESIVE RUBBER SHEET

This Nonprovisional application claims priority under 35 U.S.C. § 119(a) on Patent Application No(s). 2002-361203 filed in Japan on Dec. 12, 2002, the entire contents of which are hereby incorporated by reference.

BACKGROUND OF THE INVENTION

1. Field of the Invention

This invention relates to an addition curing silicone rubber composition which cures into a rubber sheet having surface adhesive property, and a pressure-sensitive adhesive rubber sheet obtained therefrom.

2. Background Art

Pressure-sensitive adhesives (PSA) are characterized in that they readily adhere to surfaces of objectives under as small pressures as finger pressing. These adhesives are utilized as SPA products including PSA tapes (e.g., Scotch® tape and Cello® tape), electrically insulating vinyl tapes, masking tapes and PSA sheets. For PSA tapes and sheets, PSA compositions based on natural rubber or synthetic rubber are often used. Undesirably, these PSA compositions are subject to thermal or optical degradation and tend to lose adhesion at low temperatures.

In contrast, silicone pressure-sensitive adhesives have excellent heat resistance, freeze resistance and electrical properties inherent to silicone and maintain adhesion without impairing these properties. They are thus widely used as PSA products where a high level of reliability is required. Typical silicone PSA compositions include a silicone PSA composition comprising a condensation product of a polysiloxane having $(CH_3)_3SiO_{0.5}$ units and $SiO_2$ units with a dimethylsilicone gum and an addition type silicone PSA composition comprising an alkenyl-containing organopolysiloxane and an organohydrogenpolysiloxane, which cures through hydrosilylation reaction. See JP-B 54-37907 corresponding to U.S. Pat. No. 3,983,298 and JP-A 63-22886 corresponding to U.S. Pat. No. 4,774,297.

Since these PSA compositions are typically coated to substrates to form thin films whose surface adhesion is utilized, no reference is made to the rubber hardness and strength. If these compositions are actually formed into rubber sheets, the sheets have sufficient adhesive property, but lack rubber strength. Then the sheets are not suited as jig-fixing sheets or shock-absorbing sheets. JP-A 8-134427 describes to specify the content of alkenyl groups in a resin. Low contents of alkenyl groups fail to provide sufficient rubber strength whereas high contents of alkenyl groups lead to insufficient adhesion. It is also known to add inorganic fillers such as powdered silica to silicone to enhance its rubber strength. Since the addition of such fillers, even in minor amounts, detracts from transparency, the composition is no longer used in the optical application, for example, as a shock-alleviating material in an image display apparatus.

SUMMARY OF THE INVENTION

An object of the invention is to provide an addition curing silicone rubber composition which cures into a rubber sheet that has a satisfactory rubber strength and surface adhesive property and can be transparent, and a pressure-sensitive adhesive rubber sheet obtained by curing the same.

It has been found that by combining a first silicone resin intended for imparting adhesive property with a second silicone resin intended for imparting rubber strength and formulating them with other components to the addition curing type, there is obtained a silicone rubber composition which possesses a certain rubber hardness and strength, and an adhesive property sufficient to tightly bond to various substrates and parts for fixing.

In a first aspect of the invention, there is provided an addition curing silicone rubber composition having surface adhesive property, comprising as main components, (A) 10 to 75 parts by weight of an organopolysiloxane containing at least two silicon atom-bonded alkenyl groups in a molecule, (B) 20 to 70 parts by weight of a resinous copolymer composed mainly of $R_3SiO_{1/2}$ units and $SiO_2$ units in a molar ratio between 0.5/1 and 1.5/1 wherein R is a substituted or unsubstituted monovalent hydrocarbon group, with the proviso that R is free of alkenyl groups or if any, the total content of alkenyl groups is less than 0.0001 mol/g, (C) 5 to 50 parts by weight of a resinous copolymer composed mainly of $R'_3SiO_{1/2}$ units and $SiO_2$ units in a molar ratio between 0.5/1 and 1.5/1 wherein R' is a substituted or unsubstituted monovalent hydrocarbon group and includes an alkenyl group, and the total content of alkenyl groups is at least 0.0001 mol/g, (D) 0.5 to 30 parts by weight per 100 parts by weight of components (A), (B) and (C) combined of an organohydrogenpolysiloxane containing at least two silicon atom-bonded hydrogen atoms in a molecule, and (E) a catalytic amount of an addition reaction catalyst.

In a second aspect, a pressure-sensitive adhesive rubber sheet is obtained by curing the silicone rubber composition defined above.

DESCRIPTION OF THE PREFERRED EMBODIMENTS

Component (A) in the addition curing silicone rubber composition of the present invention is an organopolysiloxane containing, on the average, at least two alkenyl groups in a molecule. The preferred organopolysiloxane as component (A) has the average compositional formula (1).

$$R^1_a SiO_{(4-a)/2} \qquad (1)$$

In formula (1), $R^1$ which may be the same or different is a substituted or unsubstituted monovalent hydrocarbon group having 1 to 10 carbon atoms, preferably 1 to 8 carbon atoms, and "a" is a positive number in the range of 1.5 to 2.8, preferably 1.8 to 2.5, more preferably 1.95 to 2.05.

Examples of the silicon atom-bonded, substituted or unsubstituted, monovalent hydrocarbon groups represented by $R^1$ include alkyl groups such as methyl, ethyl, propyl, isopropyl, butyl, isobutyl, tert-butyl, pentyl, neopentyl, hexyl, cyclohexyl, octyl, nonyl and decyl, aryl groups such as phenyl, tolyl, xylyl and naphthyl, aralkyl groups such as benzyl, phenylethyl, and phenylpropyl, alkenyl groups such as vinyl, allyl, propenyl, isopropenyl, butenyl, hexenyl, cyclohexenyl and octenyl, and substituted ones of the foregoing groups in which some or all of the hydrogen atoms are substituted with halogen atoms (e.g., fluoro, bromo, chloro), cyano groups or the like, such as chloromethyl, chloropropyl, bromoethyl, trifluoropropyl, and cyanoethyl. It is preferred that methyl groups comprise at least 90% of the entire groups $R^1$.

It is requisite that among the groups $R^1$, at least two groups be alkenyl groups (which preferably have 2 to 8 carbon atoms, more preferably 2 to 6 carbon atoms). The content of alkenyl groups is preferably 0.0001 to 20 mol %, more preferably 0.001 to 10 mol %, even more preferably 0.01 to 5 mol % based on the entire organic groups (i.e., substituted or unsubstituted monovalent hydrocarbon groups) $R^1$. The alkenyl groups may be bonded to either silicon atoms at ends of the molecular chain or silicon atoms midway the molecular chain or both. It is preferred for the organopolysiloxane to contain at least alkenyl groups bonded to silicon atoms at both ends of the molecular chain.

No particular limits are imposed on the degree of polymerization, meaning that use may be made of any organopolysiloxanes varying from liquid to gum-like at normal temperatures. It is generally preferred to use an organopolysiloxane having a degree of polymerization of about 50 to about 20,000, more preferably about 100 to 10,000, most preferably about 100 to about 2,000.

Basically the organopolysiloxane has a straight-chain structure whose backbone consists essentially of repeating diorganosiloxane ($R^1{}_2SiO_{2/2}$) units and which is capped with triorganosiloxy ($R^1{}_3SiO_{1/2}$) groups or hydroxydiorganosiloxy (($HO)R^1{}_2SiO_{1/2}$) groups at both ends of the molecular chain although it may partially include a branched or cyclic structure.

Component (B) is a resinous copolymer, that is, a copolymer of three-dimensional network structure. This copolymer is composed mainly of $R_3SiO_{1/2}$ units and $SiO_2$ units. Herein R is a substituted or unsubstituted monovalent hydrocarbon group, preferably having 1 to 10 carbon atoms, more preferably 1 to 8 carbon atoms. Examples of the monovalent hydrocarbon groups represented by R include alkyl groups such as methyl, ethyl, propyl, isopropyl, butyl, isobutyl, tert-butyl, pentyl, neopentyl, hexyl, cyclohexyl, octyl, nonyl and decyl, aryl groups such as phenyl, tolyl, xylyl and naphthyl, aralkyl groups such as benzyl, phenylethyl, and phenylpropyl, alkenyl groups such as vinyl, allyl, propenyl, isopropenyl, butenyl, hexenyl, cyclohexenyl and octenyl, and substituted ones of the foregoing groups in which some or all of the hydrogen atoms are substituted with halogen atoms (e.g., fluoro, bromo, chloro), cyano groups or the like, such as chloromethyl, chloropropyl, bromoethyl, trifluoropropyl, and cyanoethyl.

The resinous copolymer (B) may consist of $R_3SiO_{1/2}$ units and $SiO_2$ units. If necessary or desirable, the copolymer may further contain $R_2SiO$ units and $RSiO_{3/2}$ units (wherein R is as defined above) in a total amount of up to 50%, preferably up to 40% based on the total weight of the copolymer. The molar ratio of $R_3SiO_{1/2}$ units to $SiO_2$ units, [$R_3SiO_{1/2}/SiO_2$] is between 0.5/1 and 1.5/1, preferably between 0.5/1 and 1.3/1. Adhesive property declines with a molar ratio of less than 0.5 or more than 1.5. The content of alkenyl groups in the resinous copolymer (B) is less than 0.0001 mol/g (i.e., 0 to less than 0.0001 mol/g), preferably up to 0.00005 mol/g (i.e., 0 to 0.00005 mol/g). Most preferably no alkenyl groups are contained. With an alkenyl group content of more than 0.0001 mol/g, a sufficient adhesive force is not developable.

The resinous copolymer (B) may be either a liquid having fluidity or a solid having no fluidity at normal temperatures (e.g., 25° C.) although a normally solid one is preferred as long as the adhesive property of cured product is concerned. The resinous copolymer may be prepared by hydrolyzing a suitable chlorosilane or alkoxysilane by any method well known to the art.

Component (C) is a resinous copolymer, that is, a copolymer of three-dimensional network structure. This copolymer is composed mainly of $R'_3SiO_{1/2}$ units and $SiO_2$ units. Herein R' is a substituted or unsubstituted monovalent hydrocarbon group, preferably having 1 to 10 carbon atoms, more preferably 1 to 8 carbon atoms. Examples of the monovalent hydrocarbon groups represented by R' include alkyl groups such as methyl, ethyl, propyl, isopropyl, butyl, isobutyl, tert-butyl, pentyl, neopentyl, hexyl, cyclohexyl, octyl, nonyl and decyl, aryl groups such as phenyl, tolyl, xylyl and naphthyl, aralkyl groups such as benzyl, phenylethyl, and phenylpropyl, alkenyl groups such as vinyl, allyl, propenyl, isopropenyl, butenyl, hexenyl, cyclohexenyl and octenyl, and substituted ones of the foregoing groups in which some or all of the hydrogen atoms are substituted with halogen atoms (e.g., fluoro, bromo, chloro), cyano groups or the like, such as chloromethyl, chloropropyl, bromoethyl, trifluoropropyl, and cyanoethyl.

The resinous copolymer (C) may consist of $R'_3SiO_{1/2}$ units and $SiO_2$ units. If necessary or desirable, the copolymer may further contain $R'_2SiO$ units and $R'SiO_{3/2}$ units (wherein R' is as defined above) in a total amount of up to 50%, preferably up to 40% based on the total weight of the copolymer. The molar ratio of $R'_3SiO_{1/2}$ units to $SiO_2$ units, [$R'_3SiO_{1/2}/SiO_2$] is between 0.5/1 and 1.5/1, preferably between 0.5/1 and 1.3/1. Sufficient rubber hardness and strength is not achievable if this molar ratio is less than 0.5 or more than 1.5. The content of alkenyl groups in the resinous copolymer (C) is at least 0.0001 mol/g, preferably 0.0001 to 0.003 mol/g, more preferably 0.0002 to 0.002 mol/g. An alkenyl content of less than 0.0001 mol/g fails to develop sufficient rubber physical properties whereas an alkenyl content of more than 0.003 mol/g may exaggerate rubber hardness at the sacrifice of adhesive force.

The resinous copolymer (C) may be either a liquid having fluidity at normal temperatures (e.g., 25° C.) (for example, having a viscosity of at least 10 mPa·s, preferably at least 50 mPa·s) or a solid having no fluidity at normal temperatures. The resinous copolymer may be prepared by hydrolyzing a suitable chlorosilane or alkoxysilane by any method well known to the art.

It is preferred for rubber physical properties and adhesive property that the total content of alkenyl groups in both the resinous copolymers (B) and (C) be in the range of 0.00001 to 0.002 mol/g, especially 0.00005 to 0.001 mol/g.

In the present composition, component (A) is compounded in an amount of 10 to 75 parts by weight, especially 20 to 70 parts by weight, component (B) is compounded in an amount of 20 to 70 parts by weight, especially 25 to 60 parts by weight, and component (C) is compounded in an amount of 5 to 50 parts by weight, especially 10 to 40 parts by weight. With less amounts of component (A), the composition loses rubber elasticity and becomes brittle. With more amounts of component (A), the composition has insufficient adhesive property and strength. With less amounts of component (B), sufficient adhesive property is not developable. With more amounts of component (B), the composition has less adhesive property and markedly poor rubber physical properties. With less amounts of component (C), sufficient adhesive property is not developable. With more amounts of component (C), the composition has less adhesive property and markedly poor rubber physical properties.

Component (D) is an organohydrogenpolysiloxane containing at least two, preferably at least three silicon atom-bonded hydrogen atoms (Si—H groups) in a molecule. It serves as a curing agent for curing the composition by inducing crosslinkage through hydrosilylating addition reaction of Si—H groups in its molecule with silicon atom-bonded alkenyl groups in components (A), (B) and (C). The preferred organohydrogenpolysiloxane (D) has the average compositional formula (2):

$$R^2_b H_c SiO_{(4-b-c)/2} \quad (2)$$

wherein $R^2$ is a substituted or unsubstituted monovalent hydrocarbon group having 1 to 10 carbon atoms, b is a positive number of 0.7 to 2.1, c is a positive number of 0.001 to 1.0, and the sum of b+c is 0.8 to 3.0. The number of silicon atom-bonded hydrogen atoms (Si—H groups) per molecule is at least 2, typically 2 to 200, preferably 3 to 100, more preferably 3 to 50.

Examples of the monovalent hydrocarbon group represented by $R^2$ are the same as exemplified for $R^1$ in formula (1), with those free of aliphatic unsaturation being preferred. Preferably, b is a positive number of 0.8 to 2.0, c is a positive number of 0.01 to 1.0, and the sum of b+c is 1.0 to 2.5.

The molecular structure of the organohydrogenpolysiloxane may be a straight, branched, cyclic or three-dimensional network structure. The number of silicon atoms per molecule, i.e., degree of polymerization is preferably in the range of about 2 to about 300, more preferably about 4 to about 150, indicating that the siloxane is liquid at room temperature (25° C.). The hydrogen atoms bonded to silicon atoms may be positioned at ends of the molecular chain or midway the molecular chain or both.

Typical examples of the organohydrogenpolysiloxane include both end trimethylsiloxy-capped methylhydrogenpolysiloxane, both end trimethylsiloxy-capped dimethylsiloxane/methylhydrogensiloxane copolymers, both end dimethylhydrogensiloxy-capped dimethylpolysiloxane, both end dimethylhydrogensiloxy-capped dimethylsiloxane/methylhydrogensiloxane copolymers, both end trimethylsiloxy-capped methylhydrogensiloxane/diphenylsiloxane copolymers, both end trimethylsiloxy-capped methylhydrogensiloxane/diphenylsiloxane/dimethylsiloxane copolymers, copolymers consisting of $(CH_3)_2HSiO_{1/2}$ units and $SiO_{4/2}$ units, and copolymers consisting of $(CH_3)_2HSiO_{1/2}$ units, $SiO_{4/2}$ units and $(C_6H_5)SiO_{3/2}$ units.

The organohydrogenpolysiloxane (D) is compounded in an amount of 0.5 to 30 parts by weight, preferably 0.8 to 20 parts by weight, per 100 parts by weight of components (A), (B) and (C) combined. Outside the range, sufficient rubber strength is lost. Differently stated, the organohydrogenpolysiloxane is compounded in such amounts that 0.5 to 5 moles, preferably 0.8 to 3 moles of silicon atom-bonded hydrogen atoms (Si—H groups) in component (D) may be available per mole of silicon atom-bonded alkenyl groups in components (A), (B) and (C).

Component (E) is an addition reaction catalyst. Typical catalysts are platinum group metal catalysts including platinum catalysts such as platinum black, platinum chloride, chloroplatinic acid, the reaction products of chloroplatinic acid with monohydric alcohols, complexes of chloroplatinic acid with olefins, complexes of chloroplatinic acid with vinylsiloxanes, and platinum bisacetoacetate, palladium catalysts, and rhodium catalysts. The addition reaction catalyst may be used in a catalytic amount, preferably in such an amount as to give about 0.5 to 1000 ppm, especially about 1 to 500 ppm of platinum group metal based on the weight of components (A), (B) and (C) combined.

Other components that may be compounded if necessary include fillers such as fumed silica, precipitated silica, ground quartz, diatomaceous earth and calcium carbonate, electroconductive fillers such as carbon black, conductive zinc white and powdered metals, and heat resistance improvers such as iron oxide and cerium oxide, however, they are undesirable where transparency is necessary. It is also optional to incorporate hydrosilylation reaction inhibitors such as nitrogen compounds, acetylene compounds, phosphorus compounds, nitrile compounds, carboxylates, tin compounds, mercury compounds and sulfur compounds, internal mold release agents such as dimethylsilicone oil, tackifiers, and thixotropic agents.

In the second aspect of the invention, a sheet having adhesive property is obtained by curing the addition curing silicone rubber composition comprising the above-described components. More particularly, the methods of manufacturing a PSA rubber sheet from the present composition include a method of forming a sheet directly from the rubber composition by compression molding, casting or injection molding; a method of forming a sheet on a metal substrate, resin substrate or resin film by insert molding, and a method of forming a rubber sheet integrated with a substrate by dipping, coating or screen printing. Preferred curing conditions used in these methods include a temperature of 80 to 250° C. and a time of 10 seconds to 1 hour. Post-cure at a temperature of 120 to 250° C. for about 1 to 100 hours may be carried out for the purpose of removing low-molecular-weight siloxane fractions. The rubber sheet generally has a thickness of 0.1 to 50 mm, preferably 0.2 to 20 mm. A thickness of less than 0.1 mm may be insufficient to take advantage of sheet elasticity whereas a thickness of more than 50 mm may be uneconomical.

The cured rubber preferably has a hardness in the range of 5 to 50, more preferably in the range of 5 to 40, as measured by a Durometer A hardness meter. With a hardness of less than 5, rubber strength may be low. With a hardness of more than 50, adhesive property may diminish. Additionally, the cured rubber preferably has a tensile strength of at least 0.3 MPa, typically 0.3 to 8 MPa, especially 0.4 to 6 MPa, as measured according to JIS K6249. The transparency of the rubber sheet is necessary on use as a cushion for image display apparatus. Preferably the rubber sheet has a total light transmittance of at least 85%, more preferably at least 90% at a thickness of 10 mm.

The rubber sheet thus obtained is useful as retainer sheets for fixing various parts and tools, for example, for fixing medical tools in hospitals or the like and for fixing dishes and pans in restaurants, party rooms or the like. It is also useful as carrier sheets in the step of assembling miniature and thin parts. Because of transparency and certain rubber strength, the rubber sheet is also used for shock alleviation in image display apparatus such as liquid crystal displays and plasma displays. The rubber sheet is effective for improving visibility by utilization of its refractive index.

EXAMPLE

Examples of the invention are given below by way of illustration and not by way of limitation. All parts are by weight.

Example 1

A silicone rubber base was prepared by combining 40 parts of a dimethylpolysiloxane (1) capped with dimethylvinylsiloxy groups at both ends of the molecular chain and having an average degree of polymerization of 300 with 45 parts of a resinous copolymer (2) consisting of $(CH_3)_3SiO_{1/2}$ units and $SiO_2$ units ($(CH_3)_3SiO_{1/2}/SiO_2=0.75$ in molar ratio) which is solid at room temperature (25° C.) and 15 parts of a resinous copolymer (3) consisting of $(CH_3)_3SiO_{1/2}$ units, $CH_2=CH(CH_3)_2SiO_{1/2}$ units and $SiO_2$ units ($[(CH_3)_3$ $SiO_{1/2}+CH_2=CH(CH_3)_2SiO_{1/2}]/SiO_2=0.8$ in molar ratio, vinyl content=0.0005 mol/g) which is solid at room temperature, mixing at 150° C. for 3 hours, and cooling. To 100 parts of the silicone rubber base were added 1.39 parts of a dimethylsiloxane/methylhydrogensiloxane copolymer (4) capped with trimethylsiloxy groups at both ends of the molecular chain and having Si—H groups on side chains (degree of polymerization 20, Si—H content 0.0060 mol/g) as a crosslinking agent and 0.05 part of ethynyl cyclohexanol as a reaction inhibitor. Agitation was continued for 15 minutes, yielding a silicone rubber composition. The silicone rubber composition was combined with 0.1 part of a platinum catalyst (Pt concentration 1%) and press cured at 120° C. for 10 minutes, yielding rubber sheets of 2 mm and 10 mm thick having adhesive property on their surface. The cured product was measured for rubber hardness (Durometer A), tensile strength, and elongation at break according to JIS K6249 using the 2-mm sheet, with the results shown in Table 1. The measurement results of surface adhesive force by a texture analyzer (EKO Instruments Co., Ltd.) are also shown in Table 1. The total light transmittance of the 10-mm sheet was measured by a haze meter (Suga Tester Co., Ltd.), with the results shown in Table 1.

Example 2

A silicone rubber base was prepared by combining 20 parts of the dimethylpolysiloxane (1) in Example 1 with 50 parts as resin weight of a toluene solution of the resinous copolymer (2) in Example 1 and 30 parts as resin weight of a toluene solution of a resinous copolymer (5) consisting of $(CH_3)_3SiO_{1/2}$ units, $CH_2=CH(CH_3)_2SiO_{1/2}$ units, $SiO_2$ units and $(CH_3)_2SiO$ units $([(CH_3)_3SiO_{1/2}+CH_2=CH(CH_3)_2SiO_{1/2}]/SiO_2=1.0$ in molar ratio, $(CH_3)_2SiO$ unit content=20 wt %, vinyl content=0.0008 mol/g) which is solid at room temperature, mixing at room temperature, heating at 120° C. in a reduced pressure for 3 hours for removing the solvent, agitating for a further 1 hour, and cooling. To 100 parts of the silicone rubber base were added 2.12 parts of the dimethylsiloxane/methylhydrogen-siloxane copolymer (4) having Si—H groups on side chains in Example 1 as a crosslinking agent and 0.05 part of ethynyl cyclohexanol as a reaction inhibitor. Agitation was continued for 15 minutes, yielding a silicone rubber composition. The silicone rubber composition was combined with 0.1 part of a platinum catalyst (Pt concentration 1%) and press cured at 120° C. for 10 minutes, yielding rubber sheets of 2 mm and 10 mm thick having adhesive property on their surface. As in Example 1, the cured product was measured for rubber hardness (Durometer A), tensile strength, and elongation at break, surface adhesive force and total light transmittance, with the results shown in Table 1.

Example 3

A silicone rubber base was prepared by combining 30 parts of a dimethylpolysiloxane (6) capped with trimethylsiloxy groups at both ends of the molecular chain, having Si atom-bonded vinyl groups on side chains as $CH_2=CH(CH_3)SiO$ units and having an average degree of polymerization of 500 (vinyl content 0.0002 mol/g) with 40 parts as resin weight of a toluene solution of a resinous copolymer (7) consisting of $(CH_3)_3SiO_{1/2}$ units, $SiO_2$ units, $CH_2=CH(CH_3)SiO$ units and $(CH_3)_2SiO$ units $((CH_3)_3SiO_{1/2}/SiO_2=0.9$ in molar ratio, the content of $CH_2=CH(CH_3)SiO$ units+$(CH_3)_2SiO$ units=15%, vinyl content=0.001 mol/g) which is solid at room temperature and 30 parts as resin weight of a toluene solution of the resinous copolymer (2) in Example 1, mixing at room temperature, heating at 120° C. in a reduced pressure for 3 hours for removing the solvent, agitating for a further 1 hour, and cooling. To 100 parts of the silicone rubber base were added 2.45 parts of the dimethylsiloxane/methylhydrogensiloxane copolymer (4) having Si—H groups on side chains (degree of polymerization 20, Si—H content 0.0060 mol/g) in Example 1 as a crosslinking agent and 0.05 part of ethynyl cyclohexanol as a reaction inhibitor. Agitation was continued for 15 minutes, yielding a silicone rubber composition. The silicone rubber composition was combined with 0.1 part of a platinum catalyst (Pt concentration 1%) and press cured at 120° C. for 10 minutes, yielding rubber sheets of 2 mm and 10 mm thick having adhesive property on their surface. As in Example 1, the cured product was measured for rubber hardness (Durometer A), tensile strength, and elongation at break, surface adhesive force and total light transmittance, with the results shown in Table 1.

Comparative Example 1

A silicone rubber base was prepared by combining 50 parts of the dimethylpolysiloxane (1) in Example 1 with 50 parts as resin weight of the resinous copolymer (2) which is solid at room temperature in Example 1, mixing at 150° C. for 3 hours, and cooling. To 100 parts of the silicone rubber base were added 0.94 part of the dimethylsiloxane/methylhydrogen-siloxane copolymer (4) in Example 1 and 0.05 part of ethynyl cyclohexanol as a reaction inhibitor. Agitation was continued for 15 minutes, yielding a silicone rubber composition. The silicone rubber composition was combined with 0.1 part of a platinum catalyst (Pt concentration 1%) and press cured at 120° C. for 10 minutes, yielding rubber sheets of 2 mm and 10 mm thick having adhesive property on their surface. As in Example 1, the cured product was measured for rubber hardness (Durometer A), tensile strength, and elongation at break, surface adhesive force and total light transmittance, with the results shown in Table 1.

Comparative Example 2

A silicone rubber base was prepared by combining 50 parts of the dimethylpolysiloxane (6) in Example 3 with 50 parts as resin weight of a toluene solution of a resinous copolymer (8) consisting of $(CH_3)_3SiO_{1/2}$ units, $CH_2=CH(CH_3)_2SiO_{1/2}$ units and $SiO_2$ units $([(CH_3)_3SiO_{1/2}+CH_2=CH(CH_3)_2SiO_{1/2}]/SiO_2=0.8$ in molar ratio, vinyl content=0.0002 mol/g) which is solid at room temperature, mixing at room temperature, heating at 120° C. in a reduced pressure for 3 hours for removing the solvent, agitating for a further 1 hour, and cooling. To 100 parts of the silicone rubber base were added 2.33 parts of the dimethylsiloxane/methylhydrogen-siloxane copolymer (4) in Example 1 and 0.05 part of ethynyl cyclohexanol as a reaction inhibitor. Agitation was continued for 15 minutes, yielding a silicone rubber composition. The silicone rubber composition was combined with 0.1 part of a platinum catalyst (Pt concentration 1%) and press cured at 120° C. for 10 minutes, yielding rubber sheets of 2 mm and 10 mm thick having adhesive property on their surface. As in Example 1, the cured product was measured for rubber hardness (Durometer A), tensile strength, and elongation at break, surface adhesive force and total light transmittance, with the results shown in Table 1.

TABLE 1

|  | Example | | | Comparative Example | |
| --- | --- | --- | --- | --- | --- |
|  | 1 | 2 | 3 | 1 | 2 |
| Rubber hardness (Durometer A) | 13 | 16 | 22 | 8 | 35 |
| Tensile strength (MPa) | 0.7 | 1.0 | 1.5 | 0.1 | 2.5 |
| Elongation at break (%) | 120 | 150 | 160 | 40 | 180 |
| Surface adhesive force (g) | 50 | 68 | 32 | 60 | 2 |
| Total light transmittance (%) | 93 | 93 | 92 | 92 | 93 |

There has been described an addition curing silicone rubber composition which cures into a silicone rubber sheet that has a satisfactory rubber strength and surface adhesive property.

Japanese Patent Application No. 2002-361203 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An addition curing silicone rubber composition having a surface adhesive property, consisting essentially of:
   (A) 10 to 75 parts by weight of an organopolysiloxane containing at least two silicon atom-bonded alkenyl groups in a molecule,
   (B) 20 to 70 parts by weight of a resinous copolymer being a solid at 25° C. and composed mainly of $R_3SiO_{1/2}$ units and $SiO_2$ units in a molar ratio between 0.5/1 and 1.5/1 wherein R is a substituted or unsubstituted monovalent hydrocarbon group, with the proviso that R is free of alkenyl groups or if any, the total content of alkenyl groups is less than 0.0001 mol/g,
   (C) 5 to 50 parts by weight of a resinous copolymer composed mainly of $R'_3SiO_{1/2}$ units and $SiO_2$ units in a molar ratio between 0.5/1 and 1.5/1 wherein R' is a substituted or unsubstituted monovalent hydrocarbon group and includes an alkenyl group, and the total content of alkenyl groups is at least 0.0001 mol/g,
   (D) 0.5 to 30 parts by weight per 100 parts by weight of components (A), (B) and (C) combined of an organohydrogenpolysiloxane containing at least two silicon atom-bonded hydrogen atoms in a molecule, and
   (E) a catalytic amount of an addition reaction catalyst,
   said silicone rubber composition curing into a rubber sheet which is transparent and has a total light transmittance of at least 85% at a thickness of 10 mm.

2. The silicone rubber composition of claim 1 wherein the resinous copolymer (B) is substantially free of alkenyl groups and is solid at normal temperatures.

3. The silicone rubber composition of claim 1 wherein the resinous copolymer (C) has an alkenyl content of 0.0001 to 0.003 mol/g.

4. The silicone rubber composition of claim 1 which in the cured state has a Durometer A hardness of 5 to 50 and a tensile strength of at least 0.3 MPa.

5. A pressure-sensitive adhesive rubber sheet obtained by curing the silicone rubber composition of claim 1.

6. The silicone rubber composition of claim 1 wherein component (A) is present in an amount of 20 to 70 parts by weight.

7. The silicon rubber composition of claim 1 wherein component (B) is present in an amount of 20 to 70 parts by weight.

8. The silicon rubber composition of claim 1 wherein component (C) is present in an amount of 10 to 40 parts by weight.

9. The silicon rubber composition of claim 1 wherein component (D) is present in an amount of 0.8 to 20 parts by weight per 100 parts by weight of components (A), (B) and (C) combined.

10. A rubber sheet which is transparent and has a total light transmittance of at least 85% at a thickness of 10 mm which contains an addition curing silicone rubber composition having a surface adhesive property, comprising:
    (A) 10 to 75 parts by weight of an organopolysiloxane containing at least two silicon atom-bonded alkenyl groups in a molecule,
    (B) 20 to 70 parts by weight of a resinous copolymer being a solid at 25° C. and composed mainly of $R_3SiO_{1/2}$ units and $SiO_2$ units in a molar ratio between 0.5/1 and 1.5/1 wherein R is a substituted or unsubstituted monovalent hydrocarbon group, with the proviso that R is free of alkenyl groups or if any, the total content of alkenyl groups is less than 0.0001 mol/g,
    (C) 5 to 50 parts by weight of a resinous copolymer composed mainly of $R'_3SiO_{1/2}$ units and $SiO_2$ units in a molar ratio between 0.5/1 and 1.5/1 wherein R' is a substituted or unsubstituted monovalent hydrocarbon group and includes an alkenyl group, and the total content of alkenyl groups is at least 0.0001 mol/g,
    (D) 0.5 to 30 parts by weight per 100 parts by weight of components (A), (B) and (C) combined of an organohydrogenpolysiloxane containing at least two silicon atom-bonded hydrogen atoms in a molecule, and
    (E) a catalytic amount of an addition reaction catalyst.

* * * * *